United States Patent [19]
Kau et al.

[11] Patent Number: 5,623,905
[45] Date of Patent: Apr. 29, 1997

[54] METHOD AND ARRANGEMENT FOR CONTROLLING AN INTERNAL COMBUSTION ENGINE

[75] Inventors: Robert Kau, deceased, late of Asperg, by Sonja I. Kau, Febian Kau, Christoph Kau, heirs; Margit Müller, Asperg; Martin Knoss, Asperg; Diethard Löhr, Mainhardt, all of Germany

[73] Assignee: Robert Bosch GmbH, Stuttgart, Germany

[21] Appl. No.: 318,295

[22] Filed: Oct. 5, 1994

[30] Foreign Application Priority Data

Oct. 5, 1993 [DE] Germany .................. 43 33 896.8

[51] Int. Cl.[6] .................................................... F02D 41/00
[52] U.S. Cl. .................................................... 123/361
[58] Field of Search .................................. 123/361, 357, 123/399; 180/197

[56] References Cited

U.S. PATENT DOCUMENTS

| | | | |
|---|---|---|---|
| 5,018,383 | 5/1991 | Togai et al. | 123/361 |
| 5,050,552 | 9/1991 | Riehmann et al. | 123/361 |
| 5,079,946 | 1/1992 | Motamedi et al. | 123/361 |
| 5,113,823 | 5/1992 | Iriyama | 123/399 |
| 5,209,207 | 5/1993 | Shitani et al. | 123/399 |
| 5,323,746 | 6/1994 | Best et al. | 123/357 |
| 5,394,954 | 3/1995 | Tashiro et al. | 123/361 X |
| 5,433,283 | 7/1995 | Shultz et al. | 180/197 |

FOREIGN PATENT DOCUMENTS 2252177  7/1992  United Kingdom ............. 123/361

Primary Examiner—Raymond A. Nelli
Attorney, Agent, or Firm—Walter Ottesen

[57] ABSTRACT

The invention is directed to a method and an arrangement for controlling an internal combustion engine. An electronic adjustment of a power adjusting unit for influencing the supply of air is provided. The adjustment of this power adjusting unit as well as a value representing the load of the engine are detected. For monitoring purposes, the variable representing the load and the adjustment value of the power adjusting unit are compared to each other. The maximum position of the power adjusting unit is limited in dependence upon the load and/or the engine rpm in such a manner that the range of high loads is not reached.

11 Claims, 2 Drawing Sheets

METHOD AND ARRANGEMENT FOR CONTROLLING AN INTERNAL COMBUSTION ENGINE

BACKGROUND OF THE INVENTION

In modern control systems for internal combustion engines, often measuring devices are used for detecting operating variables of the engine or of the motor vehicle. The measuring signals of these devices form the basis for the control of the engine and therefore for the drive power of the motor vehicle. Unwanted operating states of the engine can occur because of malfunctions in the area of these measuring devices. For this reason, the measuring devices must be monitored as to operability. Such a monitoring system acquires significance for electronic engine power control systems (electronic accelerator pedal systems) wherein the power of the engine and therefore the speed and acceleration of the motor vehicle is controlled on the basis of measurement signals from position transducers. The position transducers are for an operator-controlled element, that is, for a power adjusting unit. In the past, various measures for monitoring such position transducers have been proposed.

U.S. Pat. No. 5,370,094 discloses an arrangement wherein the signal of the position transducer, which is connected to a power adjusting unit (a throttle flap), is compared to a measurement signal value for impermissible deviations. The measurement signal value indicates the Load of the engine and represents the position. If a difference between the signal values is detected, then the assumption is made that a fault has occurred in the area of the position transducer and emergency measures are initiated as may be required. It is also suggested to provide redundant position transducers so that the defective sensor can be detected in the sense of a two-out-of-three selection and so that emergency measures can be initiated on the basis of the correct signals. The defective sensor is detected by a comparison of the position signals with respect to each other as well a by a comparison of each of the position signals to the position signal formed on the basis of the load signal as to impermissible deviations.

A monitoring of the position transducers is achieved with the known procedure but the precision of this monitoring can be unsatisfactory because neither the performance of the load signal with reference to the position of the movable element nor the effects are considered which affect the precision of the measuring results such as pulsations and backflows in the intake pipe of the engine or variations of air density as a consequence of changes in elevation above sea level or of the temperature of the intake air.

SUMMARY OF THE INVENTION

In view of the foregoing, it is an object of the invention to provide measures for improving the precision of monitoring the operation of a position transducer on the basis of at least one position signal and a variable representing the load of the engine.

The method of the invention is for controlling an internal combustion engine having a power adjusting unit for influencing the air metered thereto. The method includes the steps of: controlling the power adjusting unit via an electric circuit path in accordance with a pregiven position value; detecting the actual position of the power adjusting unit and a variable representing the load of the engine; comparing the actual position and the variable; and, limiting the maximum position of the power adjusting unit in such a manner that the range of high loads is not reached.

A precise monitoring of one or more position transducers assigned to the power adjusting unit is made possible by limiting the maximum adjustment of the power adjusting unit. This is achieved because only small tolerances have to be considered in the comparison to the variable representing the load of the engine and therefore adequate precision is guaranteed.

In addition, the areas of pulsations and backflows in the intake pipe are avoided with the procedure provided by the invention. These pulsations and backflows occur in some engines when there are wide openings of the power adjusting unit.

The changing air density is taken into account when detecting faults by considering the elevation above sea level and/or the temperature of the intake air so that a further increase of accuracy is possible.

Small tolerances can be achieved when selecting the limit values which are pregiven for deciding whether a position transducer is detected as being defective.

It is especially advantageous to provide monitoring only with respect to an unwanted input of fuel in that monitoring is provided only with respect to an impermissibly large value representing the load compared to the measured position of the power adjusting unit; that is, when this value indicates a load which is too great. In this advantageous procedure, it is unnecessary to take account of the air density which changes without affecting the accuracy of monitoring.

The utilization of the procedure provided by the invention is advantageous in combination with the known two-out-of-three selection for a twin position transducer.

It is advantageous to use as a variable representing load, the signal of one of the following: an air-quantity sensor, an air-mass sensor, an intake-pressure sensor or the load signal determined from the quotient of this variable and the rpm.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
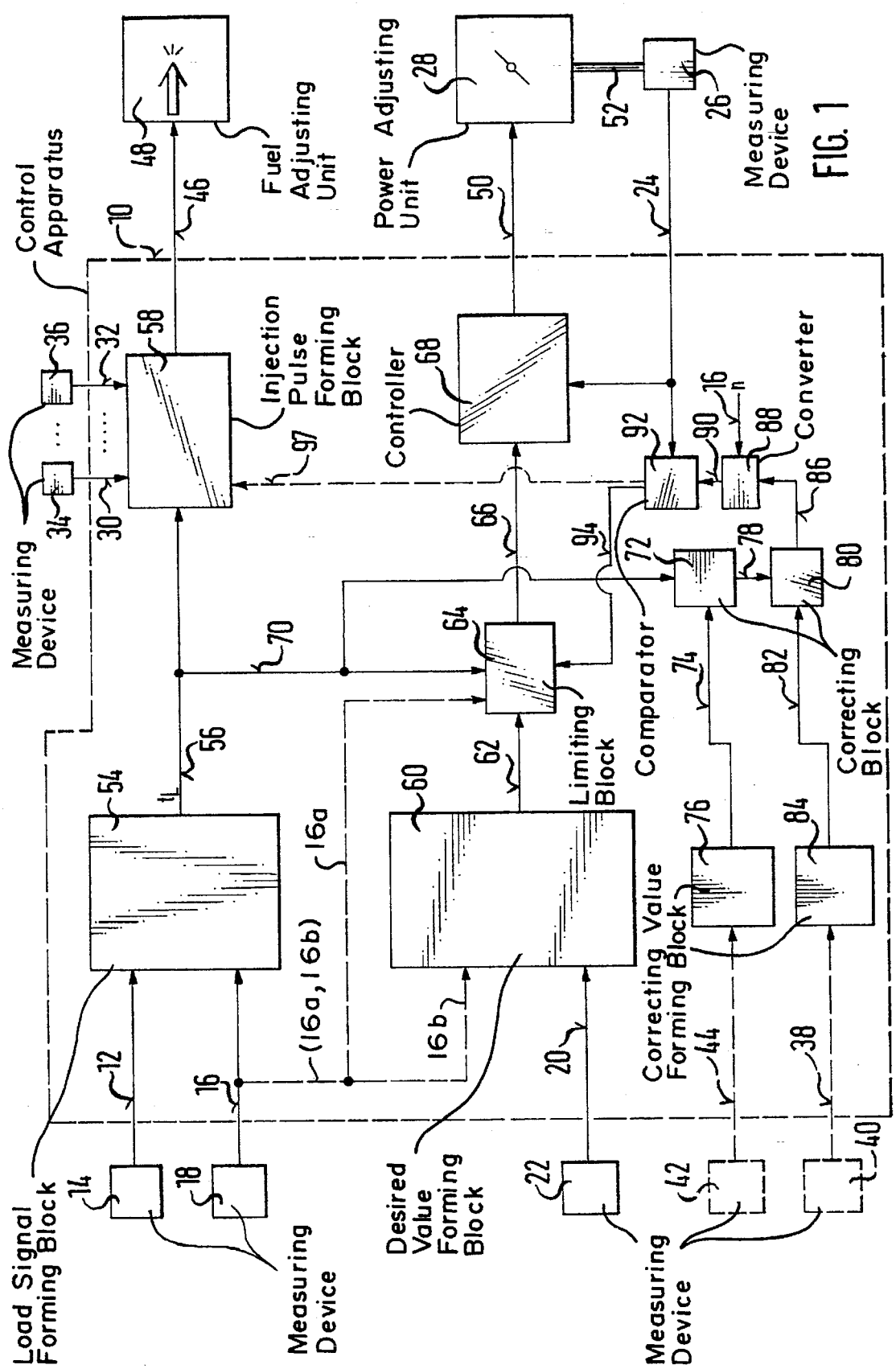
FIG. 1 is a schematic of an arrangement for carrying out the method of the invention wherein the operation of a microcomputer of the arrangement is shown by a functional block diagram; and, FIG. 2 shows a computer program in the context of a flowchart for carrying out the method of the invention.

FIG. 1 is an overview block circuit diagram of an engine control system which includes a control apparatus 10. The control apparatus 10 is a microcomputer and the elements within the region enclosed by the broken line are circuit equivalents or representations and so provide an illustrated example of the functions performed by the microcomputer. The control apparatus has the following input lines. The control apparatus 10 is connected via a first input line 12 to a measuring device 14 for detecting the air throughput through the internal combustion engine. A second input line 16 connects the measuring device 18 for detecting the engine rpm and a third input line 20 connects the measuring device 22 for detecting the position of an operator-actuated element. A measuring device 26 is connected to control apparatus 10 via a fourth input line 24 and detects the position of a power adjusting unit 28 such as a throttle flap. In addition, input lines 30 to 32 are provided to connect the control apparatus 10 to measuring devices 34 to 36, respectively, which detect operating variables which are processed for controlling the engine.

In addition, in a preferred embodiment, the input line 38 is provided which connects the control apparatus 10 to a measuring device 40 for detecting the temperature of the intake air. In another embodiment, a measuring device 42 can be provided for detecting the air pressure (elevation above sea level) in lieu of or in addition to the measuring device 40. The measuring device 42 is connected to the control apparatus 10 via the input line 44.

An output line 46 of the control apparatus 10 is connected to an adjusting device 48 (injection valve) for controlling the metering of fuel. An output line 50 from the control apparatus 10 leads to the power adjusting unit 28 which, in turn, is connected via a mechanical connection 52 to the measuring device 26.

Within the control apparatus 10, the input leads 12 and 16 lead to a block 54 for forming a load signal such as a characteristic field or a table. The output line 56 of the block 54 leads to the injection-pulse forming block 58. The input lines 30 to 32 from respective measuring devices 34 to 36 lead to injection-pulse forming block 58 for corrections in dependence upon the battery voltage, exhaust-gas composition, engine temperature, et cetera. The measuring devices 34 to 36 detect the corresponding operating variables. The output line 46 of the control apparatus 10 is the output line of the injection-pulse forming block 58. One or more injection valves for the formed injection time are driven via output line 46. A desired-value forming block 60 is a part of the control apparatus 10 and is provided for forming an adjusting desired value for the power adjusting block 28. The input line 20 is connected to block 60 whereas the output line 62 of block 60 is connected to a limiting element 64. The output line 66 of limiting element 64 is connected to the controller block 68. The output line 50 of block 68 leads to the power adjusting unit 28. The line 24 is also connected to the controller block 68. The line 70 leads from line 56 to the limiting block 64 and to a correcting block 72. The line 74 from a correction-value forming block 76 also leads to the correcting block 72. In one embodiment, the input line 44 is, in turn, connected to the correcting-value forming block 76.

The output line 78 of correcting block 72 leads to a further correcting block 80. Line 82 from a correcting-value forming block 84 is connected to correcting block 80. The input line 38 is connected to block 84. The output line 86 of correcting block 80 leads to converter 88 and the line 16 also leads to converter 88. The output line 90 of converter 88 leads to a comparator block 92. The input line 24 leads to comparator 92. The output line 94 of comparator 92 leads to the limiting block 64 and, in a preferred embodiment, to the injection-pulse forming block 58 as represented by the broken line 97. In addition, in a preferred embodiment, the input line 16 is connected to the limiting block 64 (see line 16a) and/or to the desired-value forming block 60 (see line 16b). Still other operating variables can be fed to the desired-value forming block 60 such as data as to the particular gear which is engaged, the road speed, et cetera.

The load-signal forming block 54 forms a load signal TL in accordance with known characteristic fields and transmits this measured signal value via line 56 to the injection-pulse forming block 58. The load signal TL is formed in block 54 in dependence upon the supplied measurement signals corresponding to engine rpm and air mass. The measurement signal corresponding to air mass is generated by a hot-film air-mass sensor or a hot-wire air-mass sensor 14. The load signal TL is corrected, as required, in the injection-pulse forming block 58 in dependence upon the exhaust-gas composition, battery voltage and other operating variables so that an injection pulse is generated which is optimally adapted to the operating conditions. The injection pulse signal is emitted via the line 46 to the actuating device 48 (the injection valve).

The control apparatus 10 is also equipped with means for electrically adjusting the power adjusting unit 28 (a throttle flap). A desired value for the throttle flap position DKdes is determined from the measured value for the position of an operator-actuated element in the desired-value forming block 80 in accordance with a pregiven characteristic line. This characteristic line can be dependent on rpm, road speed and/or gear stage in accordance with requirements. The desired value is outputted via line 62. In this connection, the characteristic line in the desired-value forming block 60 is pregiven in accordance with the torque behavior of the engine as a function of rpm for various gear stages so that optimal driving comfort, a minimum of fuel consumption, et cetera are provided. The throttle-flap desired value is outputted via limiting block 64 and line 66 to the controller 68 where the desired value is compared to the throttle-flap actual DKact detected by the measuring device 26. This comparison is converted into a drive signal in accordance with a pregiven control strategy, for example, in accordance with a PID control. The control signal is for the electric positioning motor of the throttle flap and is supplied via the line 50 to the power adjusting unit 28 which includes the actuating motor.

The throttle flap actual position DKact is detected by transducer 26 and is a significant measured variable for adjusting the throttle flap and therefore for adjusting the drive power. A defective detection of the throttle flap position can lead to unwanted operating conditions. For this reason, the correctness of this measured variable or the operability of the measuring device is monitored. According to the invention, this is done by a comparison of the detected measured value DKact to a reference value for the throttle flap position. This reference value is formed from a signal representing the load of the engine and is preferably the load signal TL (quotient of air flow or intake pressure and engine rpm). In other embodiments, this reference value is formed from the air-mass signal or an intake pipe pressure signal, an air quantity signal or other signal values representing the engine load and which are supplied via the input line 12.

In a preferred embodiment, the load signal is supplied via the line 70 to a correcting block 72. The load signal TL is formed on the basis of the air-mass signal which is virtually independent compared to air-density changes. In correcting block 72, and for this reason, a correction with respect to elevation above sea level is carried out in order to increase the accuracy of the comparison.

The quantity of air (which is subject to changes in air density) is pregiven by the position of the throttle flap. For this reason, a significantly smaller air-mass signal is obtained for the same throttle flap position at higher elevations above sea level than for the same throttle flap position at lower elevations above sea level. Therefore, the load signal formed on the basis of the air-mass signal has to be corrected in the correcting block 72 in dependence upon the elevation above sea level and in such a manner that it becomes greater with increasing elevation above sea level. The determination of the correcting value takes place in correcting-value forming block 76 in dependence upon a pregiven characteristic line or table on the basis of a measurement signal detected by an air-pressure sensor (measuring device 42) or on the basis of known adaptation methods. The corrected load signal is supplied via line 78 to a second correcting block 80 wherein the changing air density is corrected in dependence upon the temperature of the intake air of the engine. The correcting block is formed in the correcting-value forming unit 84 on the basis of a pregiven characteristic line, a table or a computation rule in dependence upon the intake-air temperature detected by a temperature sensor. The dependency of the correcting value on the intake-air temperature is pregiven in such a manner that an increase in magnitude of the load signal takes place with increasing intake-air temperature and therefore with reduced density of the intake air. In this way, and for a position of the throttle flap which remains the same, the changing air mass is taken account of in monitoring while the intake air changes to improve the accuracy of monitoring. The corrected load signal is supplied via line 86 to a characteristic field of converter 88 wherein a throttle flap position reference value is read out on the basis of the corrected load signal and the engine rpm and outputted via line 90 to the comparator block 92. The characteristic field of the converter 88 then corresponds essentially to the inverse of the characteristic field in the load-signal forming block 54 and is experimentally determined for each engine type.

In the comparator block 92, the detected throttle-flap actual signal is checked with respect to the reference value supplied via the line 90 for an impermissible deviation in accordance with pregiven strategies described below. If the two signals deviate impermissibly from each other, then the assumption is made that a fault has occurred in the area of the throttle-flap position measuring device and emergency measures are initiated in which the drive power is limited via the line 94 and the limiting block 64; that is, the throttle-flap position desired value is limited to a maximum value. In other advantageous embodiments, the metering of fuel to the individual cylinders is cut off, under pregiven conditions, in the injection-pulse forming block 58 via the dashed line 97.

The corresponding procedure takes place when using an air-mass signal, air-quantity signal or intake-pressure signal as the load signal. The corrections can be omitted for the air-quantity signal.

In addition to the procedure described above, the limiting block 64 is provided as a feature of the invention wherein the maximum value of the throttle flap position desired value and therefore the setting of the throttle flap itself is limited in dependence upon the load signal TL or in dependence upon the engine rpm supplied via the broken line (16a, 16b). This is done because, for the conversion of the load signal TL into a throttle flap reference signal in converter 88, large fluctuations in the throttle flap position result in response to small fluctuations in the load signal TL at high loads, that is, when the throttle flap is at wide open positions.

Accordingly, large tolerances must be pregiven for high loads when comparing the throttle-flap actual signal and the reference signal in the comparator block 92. These large tolerances could bring into question the useability of the method based on insufficient accuracy. Accordingly, the range of high loads is precluded in order to obtain the smallest tolerances possible. For this purpose, the throttle flap position desired value is limited to a maximum value in the limiting block 64. This maximum value can, for example, be 60% to 90% of the maximum possible load signal TL and is preferably 70%. This takes place in the limiting block 64 by means of a comparison step which reduces the throttle flap position determined in the desired-value forming block 60 when the load signal exceeds the pregiven limit value until the load signal drops below the pregiven limit value. The limit function can also be dependent upon rpm so that the maximum throttle-flap desired value can be determined in accordance with a pregiven characteristic line for each engine rpm and be compared to the determined throttle flap desired value. This maximum value is set whenever the maximum value of the throttle-flap desired value is exceeded. The characteristic line is pregiven in such a manner that the maximum throttle-flap desired value increases with increasing engine rpm. In other possible embodiments, the maximum value is read out of a pregiven rpm-load characteristic field wherein the rpm and the load variable are logically combined to form a maximum throttle flap position value.

The limitation of the throttle-flap position thereby makes possible the use of the monitoring procedure described above and increases the accuracy of the function.

In the procedure described, the load signal is converted into a reference value for the throttle-flap actual-value signal and is compared thereto for fault detection. In other advantageous embodiments, the throttle-flap reference-value signal can be used in lieu of the throttle-flap actual-value signal for monitoring in that the converted load signal is compared to the throttle-flap desired-value signal. In this way, fault conditions can be detected also in the area of the measuring device 22.

In addition to the conversion of the load signal into a throttle-flap signal as shown for the advantageous embodiment above, the throttle-flap signal can also be converted into a load signal in other advantageous embodiments by applying the procedure according to the invention.

For this purpose, and when utilizing air-mass measuring devices, the detected throttle-flap actual-value signal or the throttle-flap desired-value signal must be supplied to a characteristic field via an inverse correction of the elevation above sea level and the intake-air temperature. In the characteristic field, a load signal is formed on the basis of the load signal and the engine rpm in the same manner as in load-signal forming block 54. This load signal serves as reference value for the measured load signal on line 56 and is compared thereto for impermissible deviations.

Various strategies can be applied with respect to the comparison in comparator block 92. In a preferred embodiment, it is especially advantageous to provide monitoring only with respect to impermissibly high load signals as a function of the detected throttle-flap actual signal, that is, carrying out monitoring only with respect to unwanted acceleration. Here, a fault is detected when the difference between the load signal and the throttle-flap actual signal exceeds a pregiven tolerance value. In this procedure, monitoring can be undertaken even without correction of the load signal with respect to air density changes. Furthermore, a second possibility in other advantageous embodiments comprises monitoring the amount of the difference of the throttle-flap actual signal and load signal with respect to a predetermined tolerance range. In this way, protection is provided against acceleration as well as against a load signal which is too small. Furthermore, it can be advantageous to limit the monitoring to the idle operating state or to the lower part-load range so that a comparison is made only for a throttle-flap desired value in the idle range or only below a lower part-load threshold as to whether the load signal exceeds a pregiven threshold value.

Figure 2:
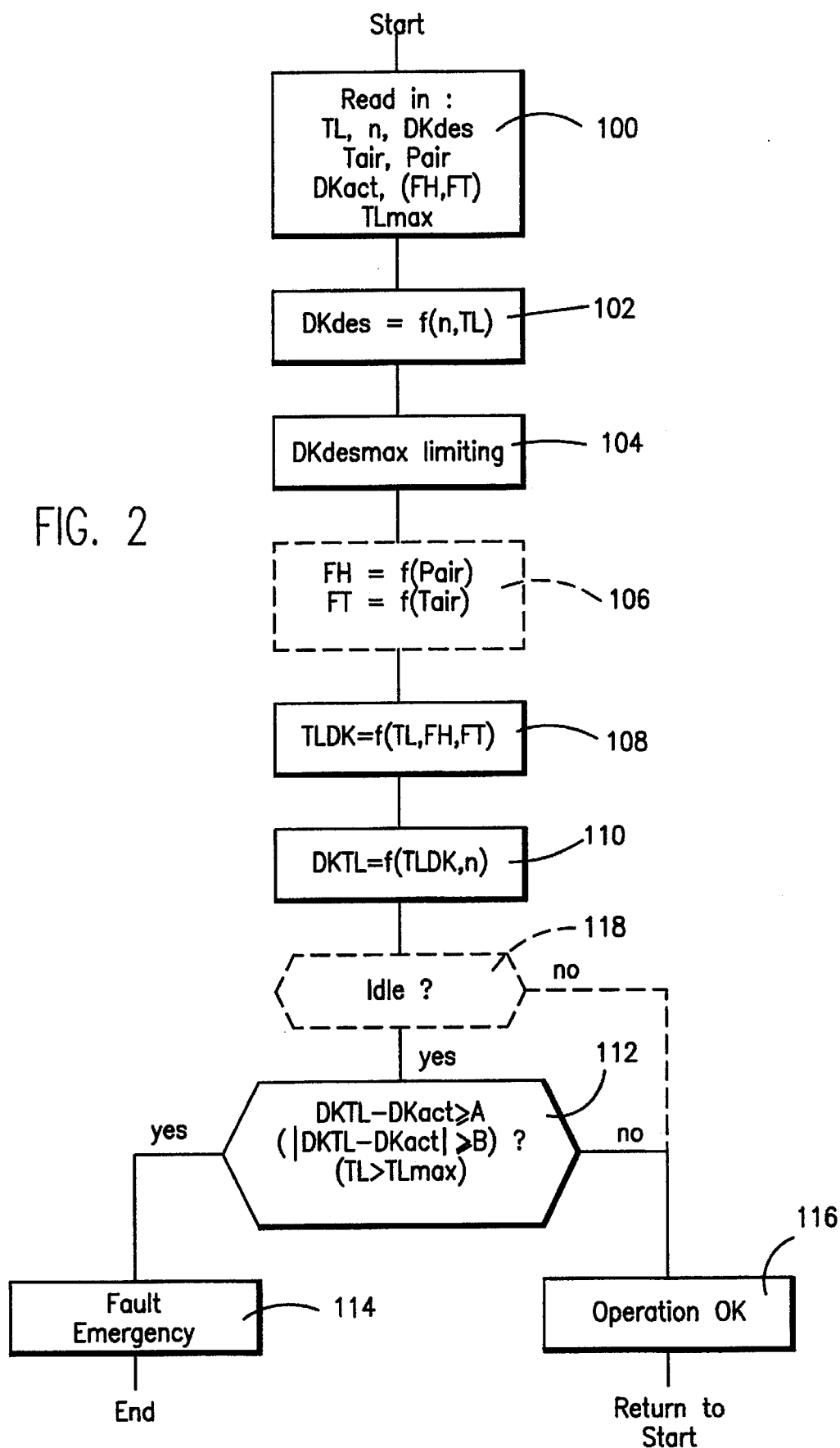

FIG. 2 is a flowchart illustrating a computer program for carrying out the method of the invention described above.

The subprogram shown in FIG. 2 is started for correctly operating air-mass and engine rpm sensors which are checked as to their operability pursuant to other methods. After the subprogram is started, the necessary measurement values are read in in a first step 100. These measured values include the load signal TL, the engine rpm (n), the throttle-flap desired value DKdes as well as the throttle-flap actual value DKact. Other values are read in when corresponding sensors are provided, such as a measure for the intake-air temperature Tair as well as the air pressure Pair as index for the elevation above sea level. If one or both of the two last-mentioned sensors are not provided, then the correcting factors FT with respect to intake-air temperature and FH with respect to elevation above sea level are read in in step 100. The corrective factors FT and FH were obtained from the appropriate adaptation methods. Depending upon the particular monitoring strategy, a load limit value for the idle range or for the lower part-load range is read in in this step.

In the next step 102, the maximum value for the throttle-flap desired value DKdesmax is determined in dependence upon a pregiven characteristic line or table on the basis of the detected load signal value TL or the detected engine rpm (n).

In the next step 104, the throttle flap desired value DKdes is limited to this maximum value when the throttle-flap desired value exceeds the pregiven maximum value. Thereafter, in step 106, when the appropriate sensors are provided, the correction factor FH is determined on the basis of a pregiven characteristic line in dependence upon the air pressure and the correction factor FT is determined on the basis of a pregiven characteristic line in dependence upon the intake-air temperature. In the next step 108, a corrected load signal value TLDK is formed as a function of the measured load-signal value TL as well as a function of the correcting factors FH and FT. Thereupon, in the next step 110, the reference value for the throttle-flap actual signal DKTL is read out from a characteristic field as a function of the corrected load-signal value TLDK and the engine rpm.

Thereafter, in the next inquiry step 112, the comparison is made between the detected throttle-flap actual signal DKact and the reference value DKTL in accordance to one of the strategies described above. In the preferred embodiment, in inquiry step 112, the difference between the reference value DKTL and the throttle-flap actual value DKact is compared to a tolerance value A. A YES-decision is made when the throttle-flap reference value is greater than the throttle-flap actual value. This means that, in accordance with step 114, a fault is detected and emergency measures must be taken because the actual engine-load signal value is greater than the detected throttle-flap position signal value, that is, the danger is present that the motor vehicle will unwantedly accelerate. The subprogram is ended in step 114.

If the difference between the reference value and the throttle-flap actual value is less than the pregiven tolerance value A, then the function of the measuring device is detected (step 116) as being in good operating order and the throttle flap is controlled in accordance with the desired value.

In other advantageous embodiments, another inquiry can be made in lieu of the inquiry carried out in step 112. In these other embodiments, the amount of the difference between the reference value DKTL and the throttle-flap actual value DKact can be made with respect to a tolerance value B which can correspond to the value A in one embodiment. In this way, impermissible deviations of the two signal values from each other in both directions can be detected. If the magnitude of the difference exceeds the tolerance value, then a fault is detected in accordance with step 114. If the magnitude of the difference is equal to or less than the tolerance value, then a correct operation can be assumed in accordance with step 116.

In accordance with the third monitoring strategy described above, an inquiry step 118 is shown in a broken-line block inserted between step 110 and 112. In this block, a check is made as to whether the system is in idle or in a lower part-load range. This is determined in that the throttle-flap desired value DKdes is compared to a limit value which delimits the idle range or lower part-load range. No monitoring is carried out if the throttle-flap desired value is above this value. Step 116 then follows. If the throttle-flap desired value is below this value (that is, has idle or the lower part-load range been reached), then, in step 112, the inquiry is made as to whether the load signal TL exceeds a pregiven limit value TLmax. If this is the case, then an impermissible deviation is detected and step 114 follows. If the load-signal value is below this limit value, then normal operation according to step 116 is detected and the subprogram is ended and repeated as required.

The procedure described is advantageous also in combination with a double sensor such as a double potentiometer for the positioning value of the power adjusting unit. The monitoring described, for example, with respect to FIG. 2 is then carried out with two positioning values. In this way, the defective sensor can be distinguished from the operational sensors (two-of-three selection). The control of the internal combustion engine can then be carried out on the basis of the operational sensors.

It is understood that the foregoing description is that of the preferred embodiments of the invention and that various changes and modifications may be made thereto without departing from the spirit and scope of the invention as defined in the appended claims.

What is claimed is:

1. A method of controlling an internal combustion engine having a throttle flap to operate on the air supplied to the engine, the method comprising the steps of:

detecting a pregiven position value (DKdes) of said throttle flap;

detecting the actual position value (DKact) of said throttle flap and forming a variable (TL) indicative of the load of said engine;

ascertaining a maximum value (DKdesmax) for the position of said throttle flap above which a change in position of said throttle flap causes only a slight change of the load of said engine; and, electrically controlling said throttle flap in dependence upon said pregiven position value (DKdesmax) and upon said position value (DKact) so that said maximum value (DKdesmax) is not exceeded.

2. An arrangement for controlling an internal combustion engine equipped with a throttle flap, the arrangement comprising:

a measuring device for detecting the actual position value (DKact) of said throttle flap;

a measuring device for providing a first variable indicative of air supplied to the engine;

a measuring device for providing a second variable indicative of engine speed; a control apparatus including a microcomputer for receiving said actual position value (DKact) and said first and second variables;

said control apparatus being electrically connected to said throttle flap for controlling said throttle flap to operate on the air supplied to the engine; and, said microcomputer being programmed to perform the following steps:
- (a) computing a variable (TL) representing the load of said engine from said first and second variables;
- (b) computing a pregiven position value (DKdes) for said throttle flap;
- (c) computing a maximum position value (DKdesmax) for the throttle flap above which a change in position of said throttle flap causes only a slight change of the load of said engine; and,
- (d) controlling said throttle flap in accordance with said pregiven position value (DKdes) so that said maximum value (DKdesmax) is not exceeded.

3. The method of claim 1, further comprising the step of limiting the maximum possible position of said throttle flap in dependence upon at least one of said variable and the rpm of the engine.

4. The method of claim 1, wherein said variable is one of an air-mass signal, an air-quantity signal, intake pipe pressure signal and the quotient of one of said signals and a signal representing the rpm of said engine.

5. The method of claim 1 further comprising the step of correcting said variable with respect to elevation above sea level and/or the intake air temperature.

6. The method of claim 1, further comprising the step of converting said variable into a reference value for the position of said throttle flap at least taking into account the engine rpm.

7. The method of claim 1, further comprising the step of correcting said pregiven position value with respect to at least one of the elevation above sea level and the intake air temperature; and, converting the corrected pregiven position value into a reference quantity while at least considering the engine rpm.

8. The method of claim 1, further comprising the step of detecting a fault when said variable is too great for a given position of said throttle flap.

9. The method of claim 1, further comprising the step of detecting a fault when said actual position of said throttle flap and said variable deviate from each other by an impermissible amount.

10. The method of claim 1, further comprising the step of detecting a fault when said variable is greater than a pregiven limit value in at least one of the following operating ranges: the idle range and the lower part-load range; and, determining said pregiven limit value to be a load which is not reached in either of said operating ranges.

11. The method of claim 1, wherein the detected actual position of said throttle flap is at least one of the following: a position desired value for said throttle flap and a value representing the position of said throttle flap; and, forming said position desired value on the basis of the position of an operator-actuated element.

* * * * *